United States Patent
Korekuni (10) Patent No.: US 8,817,170 B2
(45) Date of Patent: Aug. 26, 2014

(54) CAMERA BODY CONFIGURED TO CONTROL AN OUTPUT STRENGTH OF WIRELESS COMMUNICATION

(71) Applicant: Panasonic Corporation, Osaka (JP)

(72) Inventor: Jin Korekuni, Nara (JP)

(73) Assignee: Panasonic Corporation, Osaka (JP)

(*) Notice: Subject to any disclaimer, the term of this patent is extended or adjusted under 35 U.S.C. 154(b) by 57 days.

(21) Appl. No.: 13/644,266

(22) Filed: Oct. 4, 2012

(65) Prior Publication Data

US 2013/0258186 A1    Oct. 3, 2013

(30) Foreign Application Priority Data

Mar. 28, 2012 (JP) .................. 2012-074146

(51) Int. Cl.
*H04N 5/225* (2006.01)
*G03B 17/00* (2006.01)

(52) U.S. Cl.
USPC ............................ 348/360; 348/375; 396/532

(58) Field of Classification Search
USPC .................. 348/360–361, 375; 396/529–533
See application file for complete search history.

(56) References Cited

U.S. PATENT DOCUMENTS

| 6,839,511 B2* | 1/2005 | Nishida et al. ............... 396/87 |
| 7,955,010 B2* | 6/2011 | Tamura ....................... 396/529 |
| 2005/0212954 A1* | 9/2005 | Senba et al. ................ 348/360 |
| 2007/0147815 A1 | 6/2007 | Tanaka |

FOREIGN PATENT DOCUMENTS

| JP | 2007-094392 | 4/2007 |
| JP | 2007-116474 | 5/2007 |
| JP | 2007-150596 | * 6/2007 ............ H04N 5/225 |
| JP | 2011-091633 | 5/2011 |
| JP | 2011-120113 | 6/2011 |

* cited by examiner

*Primary Examiner* — Ngoc-Yen Vu
(74) *Attorney, Agent, or Firm* — Panasonic Patent Center (57) ABSTRACT

This camera body includes an interchangeable lens detector, a lens information recognition component, a wireless communication component, and an output controller. The interchangeable lens detector detects whether or not the interchangeable lens is mounted to the camera body. The lens information recognition component recognizes lens information related to the interchangeable lens, according to the mounting state of the interchangeable lens. The wireless communication component performs wireless communication with the outside of the camera body. The output controller controls the output strength of the wireless communication component on the basis of the lens information in the information recognition component.

20 Claims, 3 Drawing Sheets

| Identification information (identification number) | Output strength | Notes |
|---|---|---|
| A | 10 | lens affects wireless function |
| B | 10 | |
| C | 10 | |
| D | 5 | lens does not affect wireless function |
| E | 5 | |
| F | 5 | |
| ⋮ | ⋮ | |
| X | 5 | no lens mounted |

FIG. 3

CAMERA BODY CONFIGURED TO CONTROL AN OUTPUT STRENGTH OF WIRELESS COMMUNICATION

CROSS-REFERENCE TO RELATED APPLICATIONS

This application claims priority under 35 U.S.C. §119 to Japanese Patent Application No. 2012-074146, filed on Mar. 28, 2012. The entire disclosure of Japanese Patent Application No. 2012-074146 is incorporated herein by reference.

BACKGROUND

1. Technical Field

The present technology relates to a camera body, and more particularly to a camera body with which the wireless output strength can be freely varied according to the mounting state of an interchangeable lens.

2. Background Information

With some digital cameras in recent years, the wireless output strength can be manually varied (see Patent Literature 1: 2007-150596). With such a digital camera, when the zoom control portion is operated, the wireless output strength is varied according to whether or not the lens is in the state of a wide angle.

With a conventional digital camera, the wireless output strength was varied manually. When the wireless output strength is thus varied manually, the output strength is adjusted artificially, so a problem was that it was harder to set the output strength properly.

Meanwhile, when the lens can be interchanged, the required wireless output strength changes with the mounting state of the lens. For example, when the lens is mounted, the lens is prone to communication failure, so there is a decrease in the wireless transmission efficiency. On the other hand, when the lens is not mounted, communication failure is less likely to be caused by the lens, so wireless transmission efficiency is better. With prior art, however, the design did not take this fact into account, and wireless output strength was managed accordingly. Consequently, there was the risk that the power supply could not be utilized efficiently.

The present technology was conceived in light of the above problem, and it is an object of the present technology to provide a camera body with which the wireless output strength can be set to the proper level.

SUMMARY

The camera body of the present technology allows an interchangeable lens to be mounted. This camera body comprises an interchangeable lens detector, a lens information recognition component, a wireless communication component, and an output controller. The interchangeable lens detector is configured to detect whether or not the interchangeable lens is mounted to the camera body. The lens information recognition component is configured to recognize lens information related to the interchangeable lens, according to the mounting state of the interchangeable lens. The wireless communication component is configured to perform wireless communication with the outside of the camera body. The output controller is configured to control the output strength of the wireless communication component on the basis of the lens information in the information recognition component.

With the camera body of the present technology, the wireless output strength can be easily set to the proper level.

BRIEF DESCRIPTION OF THE DRAWINGS

Referring now to the attached drawings, which form a part of this original disclosure.

DETAILED DESCRIPTION OF EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

First Embodiment

Figure 1:
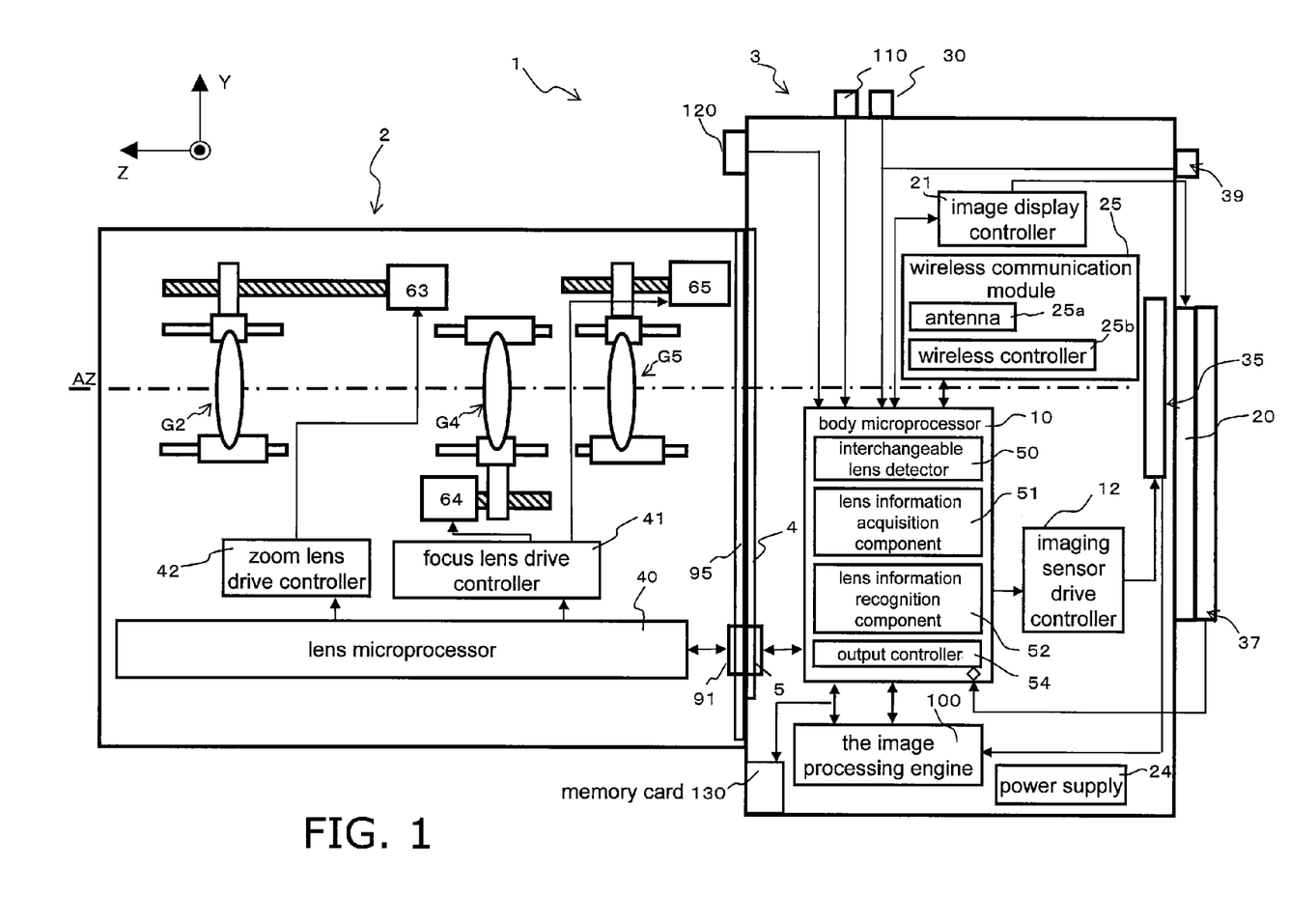
FIG. 1 is a simplified diagram of the configuration of the digital camera pertaining to an embodiment.
Figure 2:
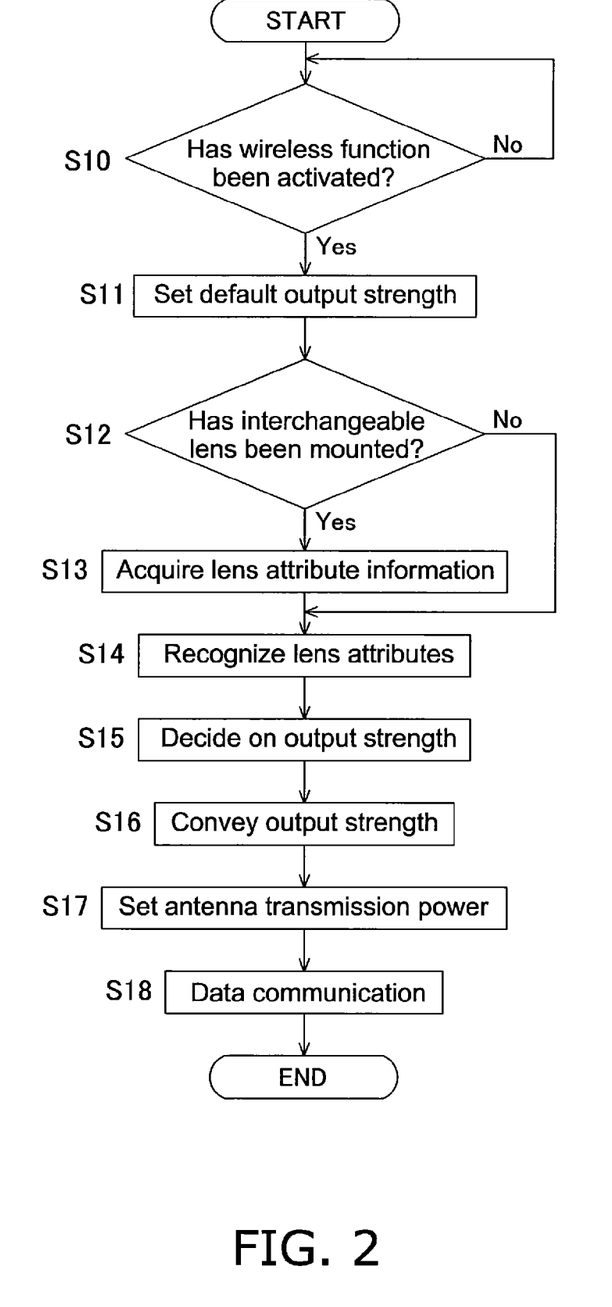
FIG. 2 is a flowchart illustrating processing in which wireless output strength is automatically adjusted according to the mounting state of an interchangeable lens.

The configuration and operation of a digital camera 1 pertaining to an embodiment will now be described through reference to FIG. 1 to 3.

1. Configuration of Digital Camera

The configuration of the digital camera 1 will now be described by giving an overview of the digital camera 1. FIG. 1 is a simplified diagram of the configuration of the digital camera 1. The digital camera 1 is an interchangeable lens type of digital camera, and mainly comprises a camera body 3 (an example of an imaging device) and an interchangeable lens 2 that is removably mounted to the camera body 3.

1-1. Configuration of Interchangeable Lens

The interchangeable lens 2 is mounted via a lens mount 95 to a body mount 4 provided to the front face of the camera body 3. A lens-side communication component 91 and a body-side communication component 5 make it possible for a lens microprocessor 40 to communicate with a body microprocessor 10.

The interchangeable lens 2 includes an object lens group G1 (not shown), a correcting lens group G3 (not shown), a zoom lens group G2, and a plurality of focus lens groups G4 and G5. The imaging distance (object distance) is varied by moving the focus lens groups G4 and G5 in the optical axis direction. The focus lens groups are respectively moved by focus motors 64 and 65, and each is independently driven via a focus lens drive controller 41 based on a command from the lens microprocessor 40. The zoom lens group G2 is moved by a zoom motor 63, and is driven via a zoom lens drive controller 42 based on a command from the lens microprocessor 40.

The lens microprocessor 40 includes a memory (not shown).

1-2. Configuration of Camera Body

The basic configuration of the camera body 3 will now be described. The camera body 3 includes the body mount 4 and the body-side communication component 5 that performs communication with the interchangeable lens 2. The camera body 3 includes the body microprocessor 10, an image processing engine 100, an imaging sensor drive controller 12, an imaging sensor 35, an image display controller 21, an image display component 20, a power supply 24, a wireless module 25, a touch panel 37, a card slot (not shown) into which a memory card 130 can be inserted, a built-in microphone 120, a still picture capture button 30, a moving picture capture button 110, and a menu operation button 39.

The body-side communication component 5 and the lens-side communication component 91 exchange data with one another. Examples of communication data include lens-specific data (lens attribute information (an example of lens information): information identifying the interchangeable lens 2, and information for determining whether or not the zoom operation of the interchangeable lens 2 can be controlled from the camera body, etc.), focus drive control signals, zoom drive control signals, exposure synchronization signals, information indicating whether or not moving picture recording is in progress, and information indicating whether or not silent mode has been set. An example of identifying information is management information. The management information includes the product number.

The body microprocessor 10 produces various kinds of control signals by acquiring the above-mentioned communication data through the body-side communication component 5 and the lens-side communication component 91. For example, the body microprocessor 10 acquires lens attribute information from the lens microprocessor 40. Consequently, the body microprocessor 10 produces camera control signals for operating the camera on the basis of the lens attribute information. The body microprocessor 10 also includes a memory (not shown).

The imaging sensor 35 produces image data by converting an optical signal formed via the optical system of the interchangeable lens 2 into an electrical signal. Drive of the imaging sensor 35 is controlled by a timing signal generated from the imaging sensor drive controller 12. The image data produced by the imaging sensor 35 is supplied to the image processing engine 100, where it undergoes various image processing.

The image processing engine 100 executes various image processing on the image data supplied from the imaging sensor 35. Image processing includes YC conversion processing, white balance correction processing, gamma correction processing, image enlargement and reduction processing, image compression and reduction processing, focal determination processing by detecting a contrast value, and so forth. The image data processed by the image processing engine 100 is recorded to the memory card 130, or displayed on the image display component 20 via the image display controller 21.

The image display component 20 reproduces and displays images recorded to the memory card 130, live monitor images, and so forth on the basis of a command from the image display controller 21.

The touch panel 37 is disposed on the surface of the image display component 20. The touch panel 37 allows the camera to be operated by directly touching the display screen. The image display controller 21 displays a graphic user interface (GUI), for example, on the image display component 20 for various touch operations.

The built-in microphone 120 converts sound into electrical signals during moving picture capture. Although not shown in the drawings, the digital camera 1 also is connected to an external microphone. An external microphone is configured to have excellent directionality, so that it is unlikely that noise generated by the driver of the interchangeable lens 2, or noise generated by the camera body 3 will be recording. Therefore, when an external microphone is connected, this external microphone may be used instead of the built-in microphone 120. During moving picture capture, the body microprocessor 10 uses a specific format to perform multiplex processing on moving picture data captured by the imaging sensor 35, and audio data collected and subjected to digital conversion by the built-in microphone 120, and records the resulting data as a moving picture file to the memory card 130.

The memory card 130 stores moving picture data or still picture data produced by the imaging sensor 35. The body microprocessor 10 executes storage processing and read processing for various kinds of data to or from the memory card 130 via the card slot (not shown).

The still picture capture button 30 (shutter button) and the moving picture capture button 110 are provided to the top face of the camera body 3, and various imaging modes are executed by operating these buttons. The still picture capture button 30 is used in a half-pressed state in which it is pressed only part of the way down, and a fully-pressed state in which it is pressed farther down. When the user presses the still picture capture button 30 half-way down, the body microprocessor 10 performs auto-focus control of the focus lens so as to bring the subject into focus. When the user presses the still picture capture button 30 all the way down, still picture data is produced according to the timing at which the still picture capture button 30 was pressed. This still picture data is recorded to the memory card 130. When the user presses the moving picture capture button 110 all the way down, the body microprocessor 10 commences the production of audio data by the built-in microphone 120, and the production of recording-use moving picture data by the imaging sensor 35. A moving picture file is then recorded to the memory card 130. Specifically, when the moving picture capture button 110 is operated by the user, the body microprocessor 10 executes various operations for moving picture recording.

The user can make various camera settings by operating the menu operation button 39 and the touch panel 37.

The body microprocessor 10 is a control device that is the command center of the camera body 3. The body microprocessor 10 detects that the user has operated one or more of the still picture capture button 30 (shutter button), the moving picture capture button 110, the menu operation button 39, the touch panel 37, etc. Also, the body microprocessor 10 includes the function of detecting that the interchangeable lens 2 has been mounted to the camera body 3, and/or the function of acquiring information necessary for controlling the digital camera 1, such as lens attribute information, focal distance information, and zoom ratio change information from the interchangeable lens 2. Furthermore, the body microprocessor 10 sends the lens microprocessor 40 control signals for controlling the zoom lens group G2 and the focus lens groups G4 and G5.

The power supply 24 supplies power to the various internal devices of the camera body 3 and the interchangeable lens 2. The power supply 24 is built into the camera body 3. In FIG. 1, arrows indicating the relation between the power supply 24 and the various devices are omitted to simplify the drawing.

The wireless module 25 is a control device that performs wireless communication with external devices. The wireless module 25 includes an antenna 25*a* that sends and receives radio waves, and a wireless controller 25*b*. The wireless controller 25*b* communicates with the body microprocessor 10. Also, the wireless module 25 includes the function of controlling the power (antenna transmission power) needed in sending radio waves from the antenna. If the antenna transmission power of the wireless module 25 is increased, the radio wave output becomes stronger and the communication distance with an external device is extended, but the power consumption of the power supply 24 increases. If the antenna transmission power of the wireless module 25 is decreased, the radio wave output becomes weaker and the communication distance with an external device decreases, but the power consumption of the power supply 24 is reduced.

2. Functions of Digital Camera

The camera body 3 is configured to allow the interchangeable lens 2 to be mounted. This camera body 3 includes an interchangeable lens detector 50, a lens information acquisition component 51, a lens information recognition component 52, the wireless module 25 (an example of a wireless communication component), and an output controller 54.

The interchangeable lens detector 50 detects whether or not the interchangeable lens 2 has been mounted to the camera body 3. More specifically, if the lens mount 95 is mounted to the body mount 4, and the body microprocessor 10 detects that the lens-side communication component 91 and the body-side communication component 5 are able to communicate, then the body microprocessor 10 determines that the interchangeable lens 2 has been mounted to the camera body 3.

When the interchangeable lens 2 is mounted to the camera body 3, the lens information acquisition component 51 acquires lens attribute information related to the interchangeable lens 2 from the interchangeable lens 2. More specifically, when the interchangeable lens 2 is mounted to the camera body 3, the body microprocessor 10 requests the lens microprocessor 40 to send lens attribute information. Thereupon, the lens microprocessor 40 sends the lens attribute information held in the memory (not shown) of the lens microprocessor 40 to the body microprocessor 10. This lens attribute information is then stored in the memory (not shown) of the body microprocessor 10.

In this embodiment, an example is provided in which the lens microprocessor 40 and/or the body microprocessor 10 includes a memory, but the memory may be separate from the lens microprocessor 40 and/or the body microprocessor 10.

The lens information recognition component 52 recognizes lens attribute information related to the interchangeable lens 2, according to the mounting state of the interchangeable lens 2.

More specifically, when the interchangeable lens 2 is mounted to the camera body 3, the body microprocessor 10 reads the lens attribute information acquired by the lens information acquisition component 51, from the memory of the body microprocessor 10 and recognizes this information. On the other hand, if the interchangeable lens 2 has not been mounted to the camera body 3, the body microprocessor 10 reads information indicating that the interchangeable lens 2 has not been mounted, as lens attribute information from the memory of the body microprocessor 10, and recognizes this information.

The wireless module 25 performs wireless communication with devices outside the camera body 3. More specifically, when the wireless module receives a communication command from the body microprocessor 10, the wireless module controls this communication data and transmits the communication data from the antenna 25a.

The output controller 54 controls the output strength of the wireless module 25 on the basis of the lens attribute information in the information recognition component. More specifically, when the body microprocessor 10 detects the mounting of the interchangeable lens 2, the body microprocessor 10 sets the output strength of the wireless module 25 on the basis of the lens attribute information acquired from the interchangeable lens 2. In this case, the body microprocessor 10 sets the output strength of the wireless module 25 so that it becomes a specific reference output strength, or becomes lower than this reference output strength. Here, the specific reference output strength is set to the maximum output strength of the wireless module 25, for example.

On the other hand, if the body microprocessor 10 detects that the interchangeable lens 2 has not been mounted, the body microprocessor 10 sets the output strength of the wireless module 25 so that it becomes lower than the specific reference output strength.

Thus, the body microprocessor 10 controls the wireless module 25 by setting the output strength of the wireless module 25. This control of the output strength of the wireless module 25 is executed by having the body microprocessor 10 issue a communication command to the wireless module 25. For example, the wireless module 25 sets an antenna transmission power corresponding to the output strength on the basis of this communication command. The wireless module 25 performs data communication with external devices by using this antenna transmission power to.

3. Operation of Digital Camera

The operation of the digital camera 1 will now be described. FIG. 2 is a flowchart showing processing in which wireless output strength is automatically adjusted according to the mounting state of an interchangeable lens with respect to a camera body.

First, the body microprocessor 10 determines whether or not the wireless function is activated (S10). For example, the body microprocessor 10 determines that the wireless function is in an active state if the user has pressed the menu operation button 39, or has operated the touch panel 37 (Yes in S10). If the wireless function is activated, the body microprocessor 10 sets the default output strength to a predetermined strength (S11). For example, the default output strength of the wireless module 25 can be set to its maximum strength.

The body microprocessor 10 constantly monitors whether or not the wireless function is active. The monitoring state corresponds to a state that the wireless function is inactive (No in S10).

Then, the body microprocessor 10 determines whether or not the interchangeable lens 2 is mounted (S12). If no interchangeable lens is mounted (No in S12), the processing in S14 (discussed below) is executed. If it is determined that the interchangeable lens 2 is mounted (Yes in S12), the body microprocessor 10 acquires lens attribute information from the mounted interchangeable lens 2 (S13). In other words, the interchangeable lens 2 conveys its lens attribute information to the body microprocessor 10. This lens attribute information includes identification information (an identification number) about the interchangeable lens 2.

Then, the body microprocessor 10 recognizes the lens attribute information (S14). For example, if no interchangeable lens is mounted (No in S12), the body microprocessor 10 reads and recognizes specific lens attribute information from the memory of the body microprocessor 10. The specific lens attribute information is default information used when no interchangeable lens is mounted. This specific lens attribute information is stored in advance in the memory of the body microprocessor 10.

On the other hand, if it is determined that the interchangeable lens 2 is mounted (Yes in S12), the body microprocessor 10 reads and recognizes the lens attribute information acquired from the interchangeable lens 2, from the memory of the body microprocessor 10.

Then, the body microprocessor 10 decides on the output strength on the basis of the identification information of the interchangeable lens 2 (S15). More specifically, if the mounted interchangeable lens 2 includes a configuration that affects wireless performance (such as the wireless communication speed or the distance over which communication is possible), the body microprocessor 10 uses the default output strength setting. On the other hand, if the mounted interchangeable lens 2 includes a configuration that does not affect wireless performance, the body microprocessor 10 changes the output strength according to the configuration of the mounted interchangeable lens 2. More specifically, the body microprocessor 10 decreases the output strength according to the configuration of the mounted interchangeable lens 2.

Even more specifically, the memory included in the body microprocessor 10 contains a data table indicating the corresponding relation between output strength and identification information for the interchangeable lens 2. This data table is created on the basis of whether or not the interchangeable lens 2 affects wireless performance.

Figure 3:
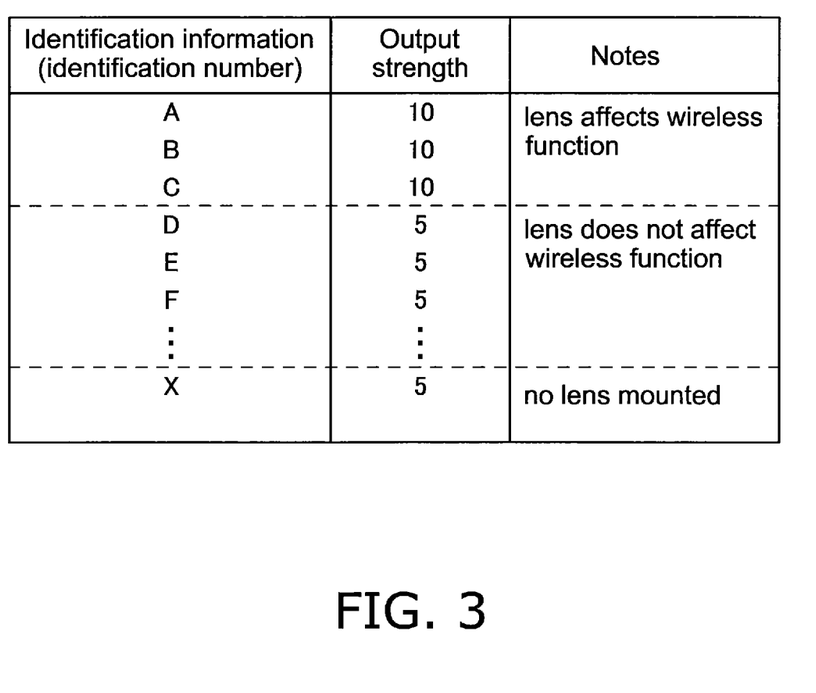
FIG. 3 is a table of the relation between lens information and output strength.

As shown in FIG. 3, for example, the data table is set up so that the output strength changes according to whether or not the interchangeable lens 2 includes a configuration that affects wireless performance. For example, if the lens includes a configuration that affects wireless performance (cases A, B, and C in FIG. 3), the data table is set up so that the output strength of this configuration (identification information) becomes the maximum output strength (the default output strength). The maximum output strength is expressed by the numeral 10 in FIG. 3.

On the other hand, if the interchangeable lens 2 includes a configuration that is unlikely to affect wireless performance (cases D, E, and F in FIG. 3), the data table is set up so that the output strength of this configuration (identification information) becomes lower than the above-mentioned maximum output strength. The output strength in these cases is expressed by the numeral 5 in FIG. 3.

Also, the data table is set up so that even if the interchangeable lens 2 has not been mounted, such as with case X in FIG. 3, the output strength of this configuration (identification information) becomes lower than the above-mentioned maximum output strength. The output strength in this case is expressed by the numeral 5 in FIG. 3.

The identification information here may also include lens specifying information for specifying the size of the lens.

In this case, if the body microprocessor 10 detects the mounting of the interchangeable lens 2 and determines, on the basis of the lens specifying information (identification information), that the size of the interchangeable lens 2 is equal to or greater than a specific size (cases A, B, and C in FIG. 3), the body microprocessor 10 sets the output strength of the wireless module 25 so that it becomes a specific reference output strength.

Also, if the body microprocessor 10 detects the mounting of the interchangeable lens 2 and determines that the size of the interchangeable lens 2 is less than a specific size (cases D, E, and F in FIG. 3) on the basis of the lens specifying information, the body microprocessor 10 sets the output strength of the wireless module 25 so that it will be lower than a specific reference output strength.

If the body microprocessor 10 has recognized the mounting of the interchangeable lens 2, but still cannot detect identification information about the interchangeable lens 2 from the data table, that is, if unknown identification information is detected, then the output strength is set to the maximum output strength.

Once the output strength has been set as above, the body microprocessor 10 conveys this output strength to the wireless module 25 (S16). The wireless controller 25b then sets an antenna transmission power corresponding to the output strength, on the basis of this output strength (S17). This antenna transmission power is received from the power supply 24, and this antenna transmission power is used to perform data communication with external devices (S18). In FIG. 2, the flowchart ends when the data communication is finished, but in actual practice the processing of S10 to S18 is executed repeatedly.

In the above embodiment, the term "output strength" is used in the meaning of "strength," and in the meaning of "information related to strength." Thus, the term "output strength" can be interpreted as dictated by the context.

4. Conclusion (4-1) The camera body 3 includes the interchangeable lens detector 50, the lens information recognition component 52, the wireless module 25, and the output controller 54. The interchangeable lens detector 50 is configured to detect whether or not the interchangeable lens 2 is mounted to the camera body 3. The lens information recognition component 52 is configured to recognize lens attribute information related to the interchangeable lens 2, according to the mounting state of the interchangeable lens 2. The wireless module 25 is configured to perform wireless communication with devices outside of the camera body 3. The output controller 54 is configured to control the output strength of the wireless module 25 on the basis of the lens attribute information in the lens information recognition component 52.

This camera body 3 can control the output strength of the wireless module 25 on the basis of lens attribute information corresponding to the mounting state of the interchangeable lens 2. Specifically, with this camera body 3, the output strength of the wireless module 25 can be appropriately set according to the mounting state of the interchangeable lens 2 and the type of interchangeable lens 2 (identification information). Consequently, the power supply can be utilized more efficiently.

(4-2) This camera body 3 further includes the lens information acquisition component 51. The lens information acquisition component 51 is configured to acquire lens attribute information related to the interchangeable lens 2 from the interchangeable lens 2 if the interchangeable lens 2 is mounted to the camera body 3. In this case, the lens information recognition component 52 recognizes the lens attribute information acquired by the lens information acquisition component 51.

With this camera body 3, if the interchangeable lens 2 is mounted to the camera body 3, lens attribute information related to the interchangeable lens 2 is acquired from the interchangeable lens 2, so the output strength of the wireless module 25 can be properly and reliably set according to the type of the interchangeable lens 2 (identification information). This allows the power supply to be utilized more efficiently.

(4-3) With this camera body 3, if the interchangeable lens 2 is not mounted to the camera body 3, the lens information recognition component 52 recognizes lens attribute information indicating that the interchangeable lens 2 is not mounted to the camera body 3.

With this camera body 3, if the interchangeable lens 2 is not mounted to the camera body 3, lens attribute information specifying this fact is recognized by the lens information recognition component, which allows the output strength of the wireless module 25 to be set properly and reliably according to the mounting state of the interchangeable lens 2. This allows the power supply to be utilized more efficiently.

(4-4) With this camera body 3, if the interchangeable lens 2 is mounted to the camera body 3, the output controller 54 controls the output strength of the wireless module 25 so that it becomes a specific reference output strength, or becomes lower than the reference output strength, on the basis of the lens attribute information acquired by the lens information acquisition component 51.

With this camera body 3, when the interchangeable lens 2 has been mounted to the camera body 3, the output strength of the wireless module 25 is set to be a specific reference output strength, or to be lower than the reference output strength, on the basis of lens attribute information. This allows the output strength to be lowered according to the type of the interchangeable lens 2 with this camera body 3. Specifically, power consumption can be reduced according to the type of the interchangeable lens 2.

(4-5) With this camera body 3, if the interchangeable lens detector 50 determines that the interchangeable lens 2 is not mounted to the camera body 3, the output controller 54 controls the output strength of the wireless module 25 so that it becomes lower than a specific reference output strength.

With this camera body 3, if the interchangeable lens 2 is not mounted to the camera body 3, the output strength of the wireless module 25 is set to be lower than a specific reference output strength. Consequently, with this camera body 3, the output strength is lowered if nothing that affects wireless performance (namely, the interchangeable lens 2) is mounted, which affords lower power consumption. Since there is nothing that affects wireless performance if the interchangeable lens 2 is not mounted, even if the output strength is lowered, it is still possible to ensure the performance required for wireless communication.

(4-6) With this camera body 3, the lens attribute information includes lens specifying information (identification information) for specifying the size of the interchangeable lens 2. In this case, if the interchangeable lens detector 50 determines that the interchangeable lens 2 is mounted to the camera body 3, and the output controller 54 determines that the size of the interchangeable lens 2 is equal to or greater than a specific size on the basis of the lens specifying information, the output controller 54 controls the output strength of the output controller 54 so that it becomes a specific reference output strength. On the other hand, if the interchangeable lens detector 50 determines that the interchangeable lens 2 has been mounted to the camera body 3, and the output controller 54 determines that the size of the interchangeable lens 2 is less than the specified size, then the output controller 54 controls the output strength of the wireless module 25 so that it will be lower than the reference output strength.

With this camera body 3, the output strength can be lowered according to the size of the interchangeable lens 2. Specifically, the power consumption can be reduced according to the size of the interchangeable lens 2.

Other Embodiments

Embodiments of the present technology are not limited to the one given above, and various alterations and changes are possible without departing from the gist of the technology. Also, the above embodiment is basically a preferred example, and is not intended to limit the present technology, its applications, or the scope of these applications.

(A) The above embodiment was premised on the fact that the mounting of the interchangeable lens 2 could be reliably determined. However, if an interchangeable lens for which it is impossible to know whether mounting is possible, such as an interchangeable lens that appeared on the market after the camera body 3, or an interchangeable lens having no lens-side communication component 91, is connected to the camera body 3, then the body microprocessor 10 determines that no lens is mounted. In this case, the present technology can be applied to an interchangeable lens for which it is impossible to know whether mounting is possible, by setting the output strength to a specific value, such as the maximum.

(B) In the above embodiment, the interchangeable lens 2 was the only external device that was mounted to the camera body 3, but the present technology can be applied to other devices besides the interchangeable lens 2. For instance, it is possible that a strobe, a microphone, or another such external device will affect wireless performance just as with the interchangeable lens 2. Accordingly, if an external device is mounted which might adversely affect wireless performance, the output strength is set to the maximum, but if nothing at all is mounted, the output strength is set relatively low, and in this way the present technology can be applied to a wide variety of external devices.

(C) In the above embodiment, an example was given in which the camera body 3 did not have the function of conveying the antenna transmission power, but this function may be provided to the camera body 3. For example, the transmission power setting may be displayed on the image display component 20 when a specific operation is made on the camera body 3.

(D) In the above embodiment, an example was given in which the output strength was set in two stages according to the configuration of the mounted interchangeable lens 2 (see FIG. 3). Instead, the output strength may be set in three or more stages according to the configuration of the mounted interchangeable lens 2 (the extent to which it affects wireless performance). Also, the output strength may be set on the basis of a specific computational formula according to the configuration of the mounted interchangeable lens 2 (the extent to which it affects wireless performance).

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the camera body. Accordingly, these terms, as utilized to describe the present technology should be interpreted relative to the camera body.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technology are provided for illustration only, and not for the purpose of limiting the technology as defined by the appended claims and their equivalents.

INDUSTRIAL APPLICABILITY

The present technology can be widely applied to camera bodies.

What is claimed is:

1. A camera body to which an interchangeable lens is mountable, the camera body comprising:
    an interchangeable lens detector configured to detect whether or not the interchangeable lens is mounted to the camera body;
    a lens information recognition component configured to recognize lens structure information related to a structure of the interchangeable lens, according to the mounting state of the interchangeable lens detected by the interchangeable lens detector, the structure of the interchangeable lens affecting a wireless communication;
    a wireless communication component configured to perform the wireless communication with a device located outside of the camera body; and
    an output controller configured to control an output strength of the wireless communication component on a basis of the lens structure information recognized by the lens information recognition component.

2. The camera body according to claim 1, further comprising:
    a lens information acquisition component configured to acquire the lens structure information from the interchangeable lens if the interchangeable lens detector detects that the interchangeable lens is mounted to the camera body, wherein
    the lens information recognition component recognizes the lens structure information acquired by the lens information acquisition component.

3. The camera body according to claim 1, wherein
    the lens information recognition component recognizes information indicating that the interchangeable lens is not mounted to the camera body if the interchangeable lens detector detects that the interchangeable lens is not mounted to the camera body.

4. The camera body according to claim 1, wherein
    if the interchangeable lens is mounted to the camera body, the output controller controls the output strength of the wireless communication component so that the output strength of the wireless communication component is a specific reference output strength or is an output strength that is lower than the specific reference output strength, on the basis of the lens structure information acquired by the lens information acquisition component.

5. The camera body according to claim 1, wherein
    if the interchangeable lens detector detects that the interchangeable lens is not mounted to the camera body, the output controller controls the output strength of the wireless communication component so that the output strength of the wireless communication component is an output strength that is lower than a specific reference output strength.

6. The camera body according to claim 1, wherein
    the lens structure information is information for specifying a size of the interchangeable lens.

7. A camera body to which an interchangeable lens is mountable, the camera body comprising:
    an interchangeable lens detector configured to detect whether or not the interchangeable lens is mounted to the camera body;
    a body microprocessor configured to obtain lens structure information related to a structure of the interchangeable lens from the interchangeable lens when the interchangeable lens detector detects that the interchangeable lens is mounted to the camera body, the structure of the interchangeable lens affecting a wireless communication;
    a wireless communication component configured to perform the wireless communication with a device located outside of the camera body; and
    an output controller configured to control an output strength of the wireless communication component on a basis of the lens structure information obtained by the body microprocessor.

8. The camera body according to claim 7, further comprising:
    a memory containing a data table including a plurality of identification information for the interchangeable lens and a plurality of output strengths of the wireless communication component, respectively;
    wherein the output controller controls the output strength of the wireless communication component by referencing the data table using the lens structure information obtained by the body microprocessor when the interchangeable lens detector detects that the interchangeable lens is mounted to the camera body.

9. The camera body according to claim 8, wherein the data table further includes an output strength of the wireless communication component to be used by the output controller when the interchangeable lens detector detects that the interchangeable lens is not mounted to the camera body.

10. The camera body according to claim 7, wherein
    the lens structure information is information for specifying a size of the interchangeable lens.

11. A camera body to which an interchangeable lens is mountable, the camera body comprising:
    an interchangeable lens detector configured to detect whether or not the interchangeable lens is mounted to the camera body;
    a lens information recognition component configured to recognize lens information related to the interchangeable lens, according to the mounting state of the interchangeable lens detected by the interchangeable lens detector;
    a wireless communication component configured to perform wireless communication with a device located outside of the camera body; and
    an output controller configured to control an output strength of the wireless communication component on a basis of the lens information recognized by the lens information recognition component, wherein if the interchangeable lens is mounted to the camera body, the output controller controls the output strength of the wireless communication component so that the output strength of the wireless communication component is a specific reference output strength or is an output strength that is lower than the specific reference output strength, on the basis of the lens information acquired by the lens information acquisition component.

12. The camera body according to claim 11, further comprising:
a lens information acquisition component configured to acquire lens information from the interchangeable lens if the interchangeable lens detector detects that the interchangeable lens is mounted to the camera body, wherein
the lens information recognition component recognizes the lens information acquired by the lens information acquisition component.

13. The camera body according to claim 11, wherein
the lens information recognition component recognizes lens information indicating that the interchangeable lens is not mounted to the camera body if the interchangeable lens detector detects that the interchangeable lens is not mounted to the camera body.

14. The camera body according to claim 11, wherein if the interchangeable lens detector detects that the interchangeable lens is not mounted to the camera body, the output controller controls the output strength of the wireless communication component so that the output strength of the wireless communication component is an output strength that is lower than the specific reference output strength.

15. A camera body to which an interchangeable lens is mountable, the camera body comprising:
an interchangeable lens detector configured to detect whether or not the interchangeable lens is mounted to the camera body;
a lens information recognition component configured to recognize lens information related to the interchangeable lens, according to the mounting state of the interchangeable lens detected by the interchangeable lens detector;
a wireless communication component configured to perform wireless communication with a device located outside of the camera body; and
an output controller configured to control an output strength of the wireless communication component on a basis of the lens information recognized by the lens information recognition component, wherein
if the interchangeable lens detector detects that the interchangeable lens is not mounted to the camera body, the output controller controls the output strength of the wireless communication component so that the output strength of the wireless communication component is an output strength that is lower than a specific reference output strength.

16. The camera body according to claim 15, further comprising:
a lens information acquisition component configured to acquire lens information from the interchangeable lens if the interchangeable lens detector detects that the interchangeable lens is mounted to the camera body, wherein
the lens information recognition component recognizes the lens information acquired by the lens information acquisition component.

17. The camera body according to claim 15, wherein
the lens information recognition component recognizes lens information indicating that the interchangeable lens is not mounted to the camera body if the interchangeable lens detector detects that the interchangeable lens is not mounted to the camera body.

18. The camera body according to claim 15, wherein if the interchangeable lens is mounted to the camera body, the output controller controls the output strength of the wireless communication component so that the output strength of the wireless communication component is the specific reference output strength or is an output strength that is lower than the specific reference output strength, on the basis of the lens information acquired by the lens information acquisition component.

19. A camera body to which an interchangeable lens is mountable, the camera body comprising:
an interchangeable lens detector configured to detect whether or not the interchangeable lens is mounted to the camera body;
a body microprocessor configured to obtain lens information from the interchangeable lens when the interchangeable lens detector detects that the interchangeable lens is mounted to the camera body;
a wireless communication component configured to perform wireless communication with a device located outside of the camera body;
an output controller configured to control an output strength of the wireless communication component on a basis of the lens information obtained by the body microprocessor; and
a memory containing a data table including a plurality of identification information for the interchangeable lens and a plurality of output strengths of the wireless communication component, respectively;
wherein the output controller controls the output strength of the wireless communication component by referencing the data table using the lens information obtained by the body microprocessor when the interchangeable lens detector detects that the interchangeable lens is mounted to the camera body.

20. The camera body according to claim 19, wherein the data table further includes an output strength of the wireless communication component to be used by the output controller when the interchangeable lens detector detects that the interchangeable lens is not mounted to the camera body.

* * * * *